(12) United States Patent
Guiton

(10) Patent No.: US 6,202,376 B1
(45) Date of Patent: *Mar. 20, 2001

(54) SANDWICH STRUCTURE

(75) Inventor: Jeremy Lehardy Guiton, London (GB)

(73) Assignee: Shell Research Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,955

(22) PCT Filed: Jul. 12, 1996

(86) PCT No.: PCT/EP96/03136

§ 371 Date: Jan. 9, 1998

§ 102(e) Date: Jan. 9, 1998

(87) PCT Pub. No.: WO97/02945

PCT Pub. Date: Jan. 30, 1997

(30) Foreign Application Priority Data

Jul. 12, 1995 (EP) .................................................. 95304862

(51) Int. Cl.$^7$ ........................................................ E04C 3/30
(52) U.S. Cl. .................................. 52/422; 52/440; 52/441
(58) Field of Search .............................. 52/415, 422–424, 52/440, 441, 442

(56) References Cited

FOREIGN PATENT DOCUMENTS

| 394566 | 11/1965 | (CH) . |
| 281689 | 9/1988 | (EP) . |
| 2038668 | 12/1970 | (FR) . |
| 2325503 | 4/1977 | (FR) . |
| 2138551A | 10/1984 | (GB) . |
| 2263164A | 7/1993 | (GB) . |

*Primary Examiner*—Beth A. Stephan

(57) ABSTRACT

A sandwich structure has a core which comprises an array of core units (3) that are arranged in a staggered pattern between the walls (1,2) of the structure such that in a first direction (II—II) adjacent core units (3) are substantially aligned whereas in another direction (III—III) at least some adjacent core units (3) partly face each other and the core units (3) are arranged in said first direction (II—II) at generally larger mutual spacings (7) than in said second direction (III—III). The thus formed core is drapeable yet structural, so that it can conform to curved structures and the staggered mutual spacings (7) form no through-gaps in the core webs so that the risk of crack formation in the walls (1,2) and between walls and core is minimized.

25 Claims, 3 Drawing Sheets

SANDWICH STRUCTURE

FIELD OF THE INVENTION

The invention relates to a sandwich structure having a pair of substantially parallel walls and a core arranged between said walls.

BACKGROUND

Sandwich structures of this type are known, for example, from French patent specifications No. 2.038.668 and 2.325.503, Swiss patent specification No. 394,566 European patent specification No. 281689 and from UK patent specifications No. 2138551 and 2263164.

The latter prior art reference discloses, inter alia, that the core may comprise an array of core units which are arranged in a staggered pattern such that in a first direction between said walls adjacent core units are substantially aligned and in a second direction between said walls which is transversal to said first direction at least some adjacent core units partly face each other.

Although the known core is suitable for many applications it has the drawback that its ability to conform to curvative in the said first direction is limited, and elongate gaps are present between adjacent rows of core units in order to create a drapeable core. These gaps form elongate zones where the walls are not supported. It has been found that in such elongate zones the walls may become subject to high stresses such that cracks in the walls or between walls and core may develop if the structure is heavily loaded in service. The risk of cracking appeared to be particularly high in areas where the gaps are relatively wide as may be the case if the structure comprises regions of compound curvature.

SUMMARY OF THE INVENTION

It is an object of the present invention to provide a sandwich structure having a core which can be easily produced and which is strong even if the structure has a complex shape.

It is a further object of the present invention to provide a sandwich structure having a core which is structural yet drapeable and which does not form through-gaps in the core web, thus retaining its structural integrity.

It is yet a further object of the present invention to provide a sandwich structure which is hardly prone to air entrapment between the core and walls of the structure during the manufacturing process of the structure.

It is also an object of the invention to provide a large core-to-face skin bond area, symmetrically balanced about the core webs, to minimize peel initiation points.

Another object of the invention is to provide an integral means of arresting the propagation of any debond between the core and the face skin, which could occur following impact loading in service.

The sandwich structure according to the invention thereto comprises a core comprising an array of core units which are arranged in said first direction at generally larger mutual spacings than in said second direction.

DETAILED DESCRIPTION

The structure according to the invention is based upon the insight that it is possible to create relatively wide gaps between adjacent core units in said first direction to provide a drapeable core, but which gaps do, because they are staggered, not form elongate zones where the walls are not supported by the core units, so that the risk of crack propagation in the walls or between walls and core is minimized.

Preferably the core units consist of rectangular or trapezoidal tubular sections which are staggered such that the openings of adjacent tubular sections are oriented in the direction of said first direction and are substantially aligned. In this way a permeable core is created through which a cooling and/or heating fluid may be circulated. Alternatively the core units may be oriented with the openings at top and bottom so that the openings face the walls of the structure. This provides greater through-thickness compression and shear strength but reduced core-to-face skin bond area, and fluid flow between the sandwich walls is prevented (or restricted if core unit webs are pierced).

It is also preferred that the core units are each at one side thereof bonded to a carrier cloth or fabric which is later laminated or bonded to one of the walls of the sandwich structure.

Furthermore, it is preferred that the core units are bonded to the carrier cloth such that when the carrier cloth is in a substantially flat position adjacent core units touch each other in said second direction and are spaced apart in said first direction such that gaps are present between adjacent aligned core units and that these gaps have a width between 0.04 and 0.4 times the core height.

If in such case the core units are rectangular tubular sections of which the openings are substantially aligned the side walls of these sections will generally be bonded to the side walls of adjacent sections by resin that will flow into the narrow gaps, if any, between these side walls so that the thus fused side walls will form drapeable I-beams which provide significant reinforcement of the structure once the resin is hardened. Even if no resin would flow into the narrow gaps the side walls of adjacent core units will support each other and reduce the risk of buckling and create a drapeable I-beam configuration.

If the carrier cloth is laminated to a curved inner surface of a wall of the sandwich structure then the core can be laid over areas where the wall has a large curvature in different directions, i.e. it is a drapeable core.

The core units and/or the walls of the sandwich structure may be made of a fibre reinforced plastic material.

If the core units are laminated or bonded to the walls of the sandwich structure and/or the carrier cloth by a compliant resin then the structure is suitable to form part of a containing means for a cryogenic fluid, such as a liquefied natural gas storage tank or pipeline. Such laminating of the core units to the wall(s) and/or carrier cloth is also useful if the sandwich structure is subject to repeated impact.

If the sandwich structure is a tubular, flat or curved component of a ship, such as a hull, bulkhead, bow, deck, walkway or storage tank then the ability of the structure to withstand repeated impacts without the risk of delamination is of significance.

If the sandwich structure according to the invention is used for the manufacture of a pipe then a core may be arranged between the inner and outer pipe walls in short staggered lengths circumferentially, in longer lengths axially or, for ease of application, by winding a fabric carrier tape carrying staggered open box core units helically around the inner pipe wall.

Preferably, when seen in longitudinal direction of the carrier tape, the core units are arranged in alternating rows of two elongate open box core units and three short open box core units.

It is also preferred that in each row the openings of adjacent open box core units face each other and a gap is present between adjacent openings, while the carrier tape is wound around the inner pipe wall at such a pitch angle that adjacent edges of the tape are contiguous.

These and other features, objects and advantages of the sandwich structure according to the invention will become apparent from the accompanying claims, abstract and drawings, in which:

DETAILED DESCRIPTION

Figures 1, 2, 3:
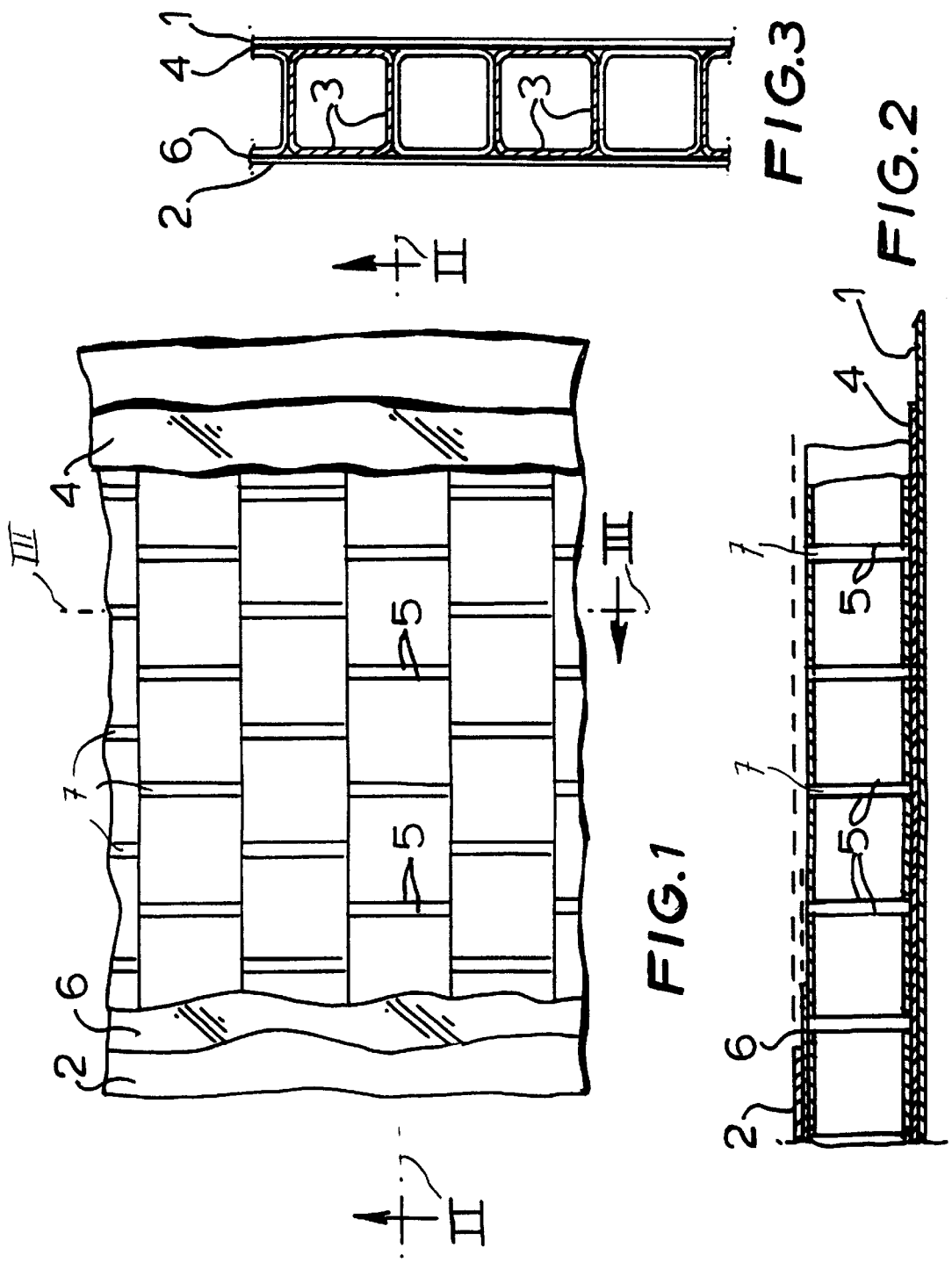
FIG. 1 shows a schematic lateral sectional view of a sandwich structure according to the invention.
FIG. 2 shows a sectional view of the sandwich structure of FIG. 1 taken along line II—II and seen in the direction of the arrows.
FIG. 3 shows a sectional view of the sandwich structure of FIG. 1 taken along line III—III and seen in the direction of the arrows.

The sandwich structure shown in FIGS. 1–5 comprises a pair of substantially parallel walls 1 and 2 and a staggered array of open box core units 3. The core units are each at one side thereof bonded to a carrier cloth 4 which is laminated or bonded to one of the walls 1 of the structure.

The closure fabric 6 and the other wall of the structure are then laminated or bonded onto the core units to form the outer surface.

The core units 3 consist of rectangular tubular sections which are staggered such that the openings 5 of adjacent tubular sections are substantially aligned, spaced apart at selected mutual distances 7 and oriented in the direction of line II—II, whereas in the direction of line III—III side walls of adjacent tubular sections only partly face each other without a substantial mutual spacing.

By bonding the core units 3 to the carrier cloth 4 the core can be manufactured in an automated fashion. The carrier cloth 4 can be wound up easily around an axis parallel to line III—III or II—II when the core units 3 are arranged on the outer surface of the thus scrolled carrier cloth 4 so that the pre-manufactured core is easily transportable.

Figure 5:
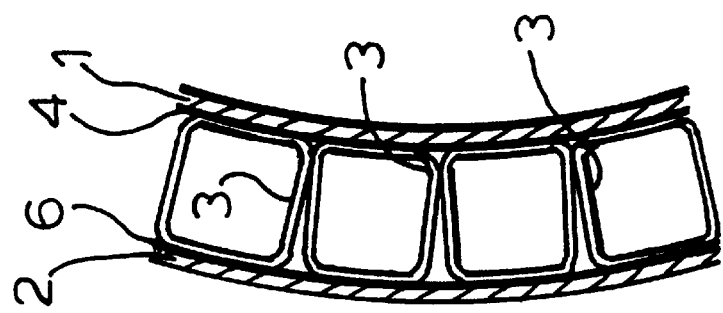
FIG. 5 shows a schematic sectional view of an area of the sandwich structure of FIG. 1 where the walls of the structure are curved in the direction of line III—III.
Figure 4:
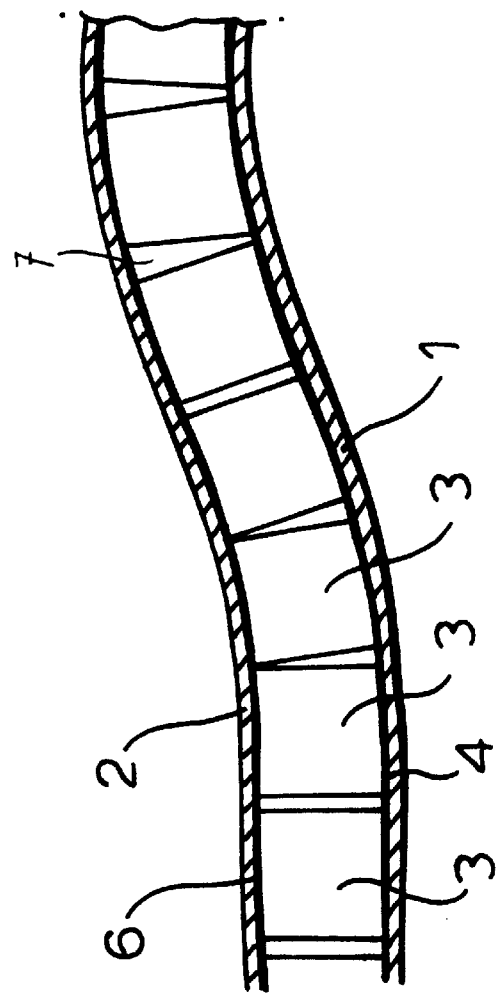
FIG. 4 shows a schematic sectional view of an area of the sandwich structure of FIG. 1 where the walls of the structure are curved in the direction of line II—II.

As shown in FIGS. 4 and 5 the core is drapeable, in particular in the direction of line II—II and also in the direction of line III—III when the structure is convex, so that it can conform to curved structures. If there are sharp, alternating curvatures of the walls 1 and 2, including concaving in the III—III direction, the carrier cloth 4 may be slit locally or applied inverted in patches locally to accommodate such compound undulation. This creates a structural core which can be readily laminated over regions of compound curvature without the need for heating or pressure and without forming through-gaps in the core web, which would cause shear-weakness.

The walls 1 and 2 of the structure as well as the core units 3 are in the example shown made of a fibre reinforced plastic, such as an isophthalic polyester, vinyl ester or epoxy resin reinforced by glass, aramid or carbon filaments.

Other formable materials, such as metals and thermoplastics, would, however, be equally suitable for use in the sandwich structure according to the invention.

The use of staggered nearly square open box core units 3 in the pattern shown in the drawings is particularly useful since it provides short and multiple air escape routes to the rims of the units 3 and from there via the interior of the units when the units 3 are laminated to the wall 1 and overlayed by the closing laminate forming the wall 2.

Thus, the sandwich structure can be assembled without applying significant pressure in order to strike out any air entrapments between the core units 3 and the walls 1 and 2. It will be understood that in order to avoid any air entrapments the presence of a permeable carrier cloth between the units 3 and a permeable closure cloth 6 between the core units 3 and the other wall is not of significance, since any entrapped air can be readily rolled out from the wall-core interface to escape into the interior of the core units 3.

The presence of short gaps between the adjacent core units also provide a debond arrest capability in the event that any delamination would occur between any of the walls 1 and 2 and some of the core units 3.

The risk of delamination can further be reduced by bonding the core units 3 to the walls 1 and 2 and to the carrier cloth 4 by a compliant resin such as toughened epoxy, urethane acrylate, methacrylate, etc.

Use of a compliant resin as the laminating resin or as bonding agent between the various components would make the sandwich structure suitable to resist repeated impacts and for use in cryogenic service.

The sandwich structure according to the invention may find application in pipelines, support beams, hulls including the bows, decks, deckhouse, superstructures, modules, partitioning, cable trays, trunking, tanks and bulkheads of ships and other marine and offshore structures, and in partitions, cladding, walls, roofs, floors, trunking, piping, tanks and cable trays of land transportation and land based vehicles and structures.

It may also find application in pipelines and tanks for cryogenic service, such as dome-shaped and cylindrical LNG tanks on ships and onshore.

The presence of open-box core units 3 with aligned openings provide a permeable core which permits passage of fluid between the walls 1 and 2.

Such passage of fluid may be used for cooling of the walls by a cooling fluid to achieve fire resistance, for leak and/or failure detection, for heat exchange, and for creating a vacuum between the walls 1 and 2 for creating an improved insulation. A fluid which subsequently sets may also be introduced via said aligned openings for e.g. thermal or acoustic insulation purposes.

If the sandwich structure forms a tubular wall of a pipeline then this pipeline can be used for carriage of two separate fluids.

Figure 6:
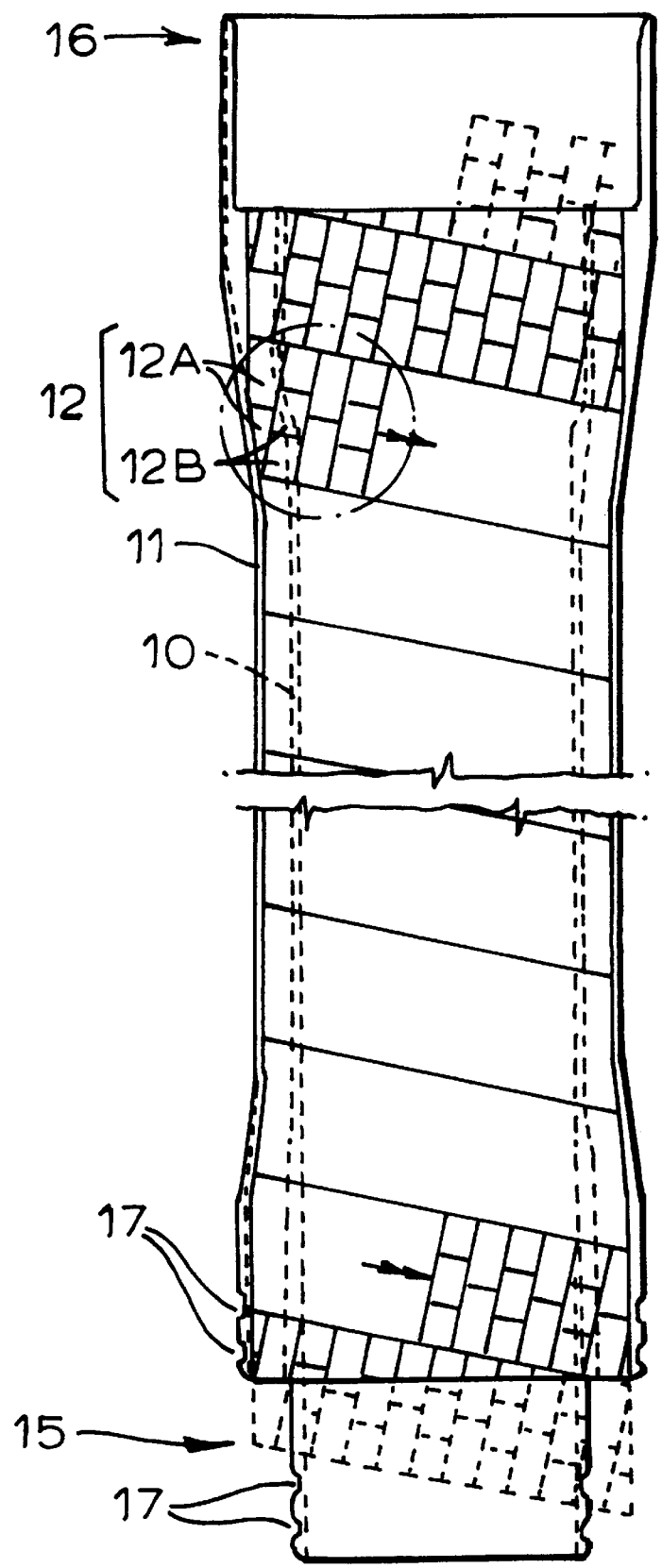
FIG. 6 shows a schematic longitudinal sectional view of a double-walled pipe section which comprises staggered array of core units according to the invention.

Referring now to FIG. 6, there is shown a double walled plastic pipe comprising a sandwich structure according to the invention. The pipe comprises an inner wall 10 (shown in dotted lines) and an outer wall 11 and a core comprising an array of staggered core units 12 arranged between said walls.

Figure 7:
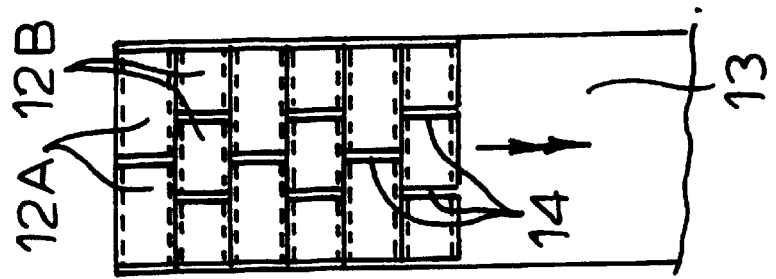
FIG. 7 shows the encircled detail of FIG. 6.

As shown in FIG. 7 the core units 12 are mounted on an elongate polyether fabric carrier tape 13 which is helically wound around the inner pipe wall 10.

When seen in longitudinal direction of the carrier tape 13, as illustrated by the arrows in FIGS. 6 and 7, the core units 12 are arranged in alternating rows of two elongate open box core units 12A and three short open box core units 12B.

In each row a gap 14 is present between adjacent core units 12 and the open ends of the adjacent core units 12 face the gap. Furthermore the core units 12 are mounted on the carrier tape 13 such that at the carrier tape 13—core unit 12 interface the core units 12A and 12B of adjacent rows lie side by side without a spacing therebetween and such that the core unit 12B in the middle of each row of three short core units 12B only partly faces the sides of the core units 12A of each adjacent row of two elongate core units 12A.

As shown in FIG. 6 the tape 13 is scrolled helically around the inner wall 10 at such a pitch angle that adjacent edges of the tape are substantially contiguous and the location of the openings of the core units of adjacent windings of the tape 13 which result may be staggered, aligned or in any intermediate position without obstructing the fluid channel between the walls.

The pipe section shown in FIG. 6 comprises a male end 15 and a female end 16 which are shaped such that the male end 15 of one pipe section fits accurately within the female end 16 of an adjacent pipe section.

As shown by the dotted lines the core units 12 are machined away at each end of the pipe section such that the core has ring-shaped ends. The open box core units 12 provide a slightly spiralling annular fluid channel between the inner and outer wall of the pipe section through which a cooling or other fluid can be pumped.

At the male end 15 of the pipe section annular grooves 17 are machined into the outer surfaces of the inner and outer pipe walls. When in use O-rings (not shown) are inserted into the grooves 17 to provide a fluid tight seal between the fluid channel provided by the core between the pipe walls 10 and 11 and both the pipe interior and pipe exterior.

It will be understood that FIG. 6 provides a schematic view of the pipe and core units and that the core units are not shown in an accurate perspective view.

If no fluid is passed through the core during normal use of a tubular, curved or flat sandwich structure according to the invention then the structure provides a double integrity containment.

In any of the above described or other applications the sandwich structure according to the invention provides a strong lightweight panel, tube or structure which can be manufactured easily and without significant risk of air entrapments between the core units and walls, which makes it suitable for mass production.

What is claimed is:

1. A sandwich structure having a pair of substantially parallel walls and a core which is arranged between said walls, said core comprising an array of core units which are arranged in a staggered pattern such that in a first direction between said walls adjacent core units are substantially aligned and in a second direction between said walls, said second direction transversal to said first direction, at least some adjacent core units partly face each other, wherein the core units are arranged in said first direction at generally larger mutual spacings than in said second direction, wherein the core units are each at one side thereof bonded to a carrier cloth or fabric which is laminated or bonded to one of the walls of the sandwich structure; and wherein said first direction is substantially parallel to said substantially parallel walls.

2. The sandwich structure of claim 1, wherein the core units consist of rectangular or trapezoidal tubular sections having openings, said tubular sections staggered such that the openings of adjacent tubular sections are oriented in the direction of said first direction and are substantially aligned.

3. The sandwich structure of claim 1, wherein the core units consist of rectangular or tapering tubular sections which are staggered such that openings of adjacent tubular sections face the walls of the structure.

4. The sandwich structure of claim 1, wherein the core is permeable and forms part of a fluid channel through which a cooling, heating or leak-detecting fluid can be pumped into or from or both into and from the space between the walls of the sandwich structure.

5. The sandwich structure of claim 1 wherein the core units are bonded to the carrier cloth such that when the carrier cloth is in a substantially flat position adjacent core units touch each other in said second direction and are spaced apart in said first direction such that gaps are present between adjacent aligned core units and that said gaps have a width between 0.04 and 0.4 times the core height.

6. The sandwich structure of claim 5, wherein the carrier cloth or fabric is laminated or bonded to a convex shaped inner surface or a concave shaped inner surface or both a convex shaped inner surface and a concave shaped inner surface of a wall of the sandwich structure.

7. The sandwich structure of claim 1 wherein the core units or the walls or both the core units and the walls of the sandwich structure are made of a fibre reinforced plastic material.

8. The sandwich structure of claim 1, wherein the core units are laminated or bonded to the walls of the sandwich structure or to the carrier cloth or to fabric or to both the walls of the sandwich structure and the carrier cloth or to both the walls of the sandwich structure by a compliant resin.

9. The sandwich structure of claim 8, wherein the sandwich structure forms part of a containing means for a cryogenic fluid.

10. The sandwich structure of claim 1, wherein the structure is a pipe having substantially co-axial inner and outer walls and the core consists of core units that are mounted on an elongate fabric carrier tape which is wound helically around the inner wall of the pipe.

11. The sandwich structure of claim 10, wherein, when seen in longitudinal direction of the carrier tape, the core units are arranged in alternating rows of one, two or more elongate open box core units and two, three or more short open box core units.

12. The sandwich structure of claim 11, wherein in each row the openings of adjacent open box core units face each other and a gap is present between adjacent openings and the carrier tape is wound around the inner pipe wall at such a pitch angle that adjacent edges of the tape are substantially contiguous.

13. The sandwich structure of claim 1, wherein the structure forms part of a lightweight, curved, flat, tubular or other shaped structural panel.

14. The sandwich structure of claim 13, wherein the panel is a component of a ship or a component of an other offshore structure.

15. The sandwich structure of claim 14, wherein the component forms part of the group consisting of a hull deckhouse, superstructure, module, partitioning, cladding, trunking, deck, bulkhead, storage tank, pipeline, support beam, cable tray and walkway.

16. The sandwich structure of claim 13, wherein the lightweight structural panel is a component of a land transportation vehicle or of a land-based structure.

17. The sandwich structure of claim 16, wherein the component forms part of the group consisting of partition, cladding, wall, roof, floor, trunking, cable tray, piping, support beam, tank and walkway.

18. A sandwich structure having a pair of substantially parallel walls and a core which is arranged between said walls, said core comprising an array of core units which are arranged in a staggered pattern such that in a first direction between said walls adjacent core units are substantially aligned and in a second direction between said walls, said second direction transversal to said first direction, at least some adjacent core units partly face each other, wherein the core units are arranged in said first direction at generally larger mutual spacings than in said second direction, wherein the structure is a pipe having substantially co-axial inner and outer walls and the core consists of core units that are mounted on an elongate fabric carrier tape which is wound helically around the inner wall of the pipe; and wherein said first direction is substantially parallel to said substantially parallel walls.

19. The sandwich structure of claim 18, wherein, when seen in longitudinal direction of the carrier tape, the core units are arranged in alternating rows of one or more elongate open box core units and two or more short open box core units.

20. The sandwich structure of claim 19, wherein in each row the openings of adjacent open box core units face each other and a gap is present between adjacent openings and the carrier tape is wound around the inner pipe wall at such a pitch angle that adjacent edges of the tape are substantially contiguous.

21. The sandwich structure of claim 18, wherein the structure forms part of a lightweight, curved, flat, tubular or other shaped structural panel.

22. The sandwich structure of claim 21, wherein the panel is a component of a ship or a component of an other offshore structure.

23. The sandwich structure of claim 22, wherein the component forms part of the group consisting of a hull, deckhouse, superstructure, module, partitioning, cladding, trunking, deck, bulkhead, storage tank, pipeline, support beam, cable tray and walkway.

24. The sandwich structure of claim 21, wherein the lightweight structural panel is a component of a land transportation vehicle or of a land-based structure.

25. The sandwich structure of claim 24, wherein the component forms part of the group consisting of partition, cladding, wall, roof, floor, trunking, cable tray, piping, support beam, tank and walkway.

* * * * *